US009982685B2

(12) United States Patent
Vengala

(10) Patent No.: US 9,982,685 B2
(45) Date of Patent: May 29, 2018

(54) COMPRESSOR COVER WITH CIRCUMFERENTIAL GROOVE

(71) Applicant: BorgWarner Inc., Auburn Hills, MI (US)

(72) Inventor: Prasanth Vengala, Greer, SC (US)

(73) Assignee: BorgWarner Inc., Auburn Hills, MI (US)

(*) Notice: Subject to any disclaimer, the term of this patent is extended or adjusted under 35 U.S.C. 154(b) by 406 days.

(21) Appl. No.: 14/415,356

(22) PCT Filed: Jul. 11, 2013

(86) PCT No.: PCT/US2013/049996
§ 371 (c)(1),
(2) Date: Jan. 16, 2015

(87) PCT Pub. No.: WO2014/018270
PCT Pub. Date: Jan. 30, 2014

(65) Prior Publication Data
US 2015/0240834 A1    Aug. 27, 2015

Related U.S. Application Data

(60) Provisional application No. 61/676,194, filed on Jul. 26, 2012.

(51) Int. Cl.
F04D 29/42 (2006.01)
F04D 29/68 (2006.01)
(Continued)

(52) U.S. Cl.
CPC .......... F04D 29/4206 (2013.01); F02C 6/12 (2013.01); F04D 17/10 (2013.01); F04D 25/024 (2013.01);
(Continued)

(58) Field of Classification Search
CPC .......... F04D 29/4206; F04D 29/4213; F04D 29/681; F04D 29/685; F04D 17/10; F04D 25/024; F02C 6/12
See application file for complete search history.

(56) References Cited

U.S. PATENT DOCUMENTS 4,930,978 A    6/1990 Khanna et al.
5,137,419 A *  8/1992 Waterman ............. F04D 29/685
                                      415/170.1

(Continued)

FOREIGN PATENT DOCUMENTS

CN    201176893 Y    1/2009
CN    101583800 A    11/2009
(Continued)

OTHER PUBLICATIONS

Chinese Patent Application No. 201380034363.0, Office Action, 10 pages, dated May 23, 2016.
(Continued)

Primary Examiner — Igor Kershteyn
Assistant Examiner — Brian P Wolcott
(74) Attorney, Agent, or Firm — Perkins Coie LLP

(57) ABSTRACT

A turbocharger compressor cover (114) including an inner shroud contour (122) configured to receive a compressor wheel (118) having a plurality of blades (140). Each blade (140) includes a leading edge (142), a contour edge (144), and a trailing edge (146). An inlet passage (124) leads to the inner shroud contour (122) and a circumferential groove (130) is formed around the inlet passage (124). The groove (130) includes a trailing edge (136) that is aligned with the outboard end (148) of the leading edge (142) of the blades. The compressor cover (114) includes an edge relief (138) formed along the groove trailing edge (136), such as a 45 degree chamfer. The circumferential groove (130) has a width and a depth, wherein the width and depth are approximately equal. The chamfer intersects the groove (130) approximately half the depth from the bottom of the groove (130).

11 Claims, 3 Drawing Sheets

(51) Int. Cl.
    *F04D 17/10*     (2006.01)
    *F04D 25/02*     (2006.01)
    *F02C 6/12*      (2006.01)

(52) U.S. Cl.
    CPC ....... *F04D 29/4213* (2013.01); *F04D 29/681* (2013.01); *F04D 29/685* (2013.01); *F05D 2240/303* (2013.01); *F05D 2240/307* (2013.01)

(56) References Cited

U.S. PATENT DOCUMENTS

| | | | |
|---|---|---|---|
| 8,454,299 B2 * | 6/2013 | Higashimori | ....... F04D 29/4213 415/206 |
| 2006/0275113 A1 | 12/2006 | Chen | |
| 2010/0098532 A1 | 4/2010 | Diemer et al. | |
| 2011/0091323 A1 * | 4/2011 | Koike | ................... F04D 29/284 416/175 |

FOREIGN PATENT DOCUMENTS

| | | |
|---|---|---|
| CN | 102562263 A | 7/2012 |
| JP | 2003-343486 A | 12/2003 |

OTHER PUBLICATIONS

International Application No. PCT/US2013/049996, International Search Report & Written Opinion, 11 pages, dated Oct. 15, 2013.

\* cited by examiner

COMPRESSOR COVER WITH CIRCUMFERENTIAL GROOVE

BACKGROUND

Today's internal combustion engines must meet ever-stricter emissions and efficiency standards demanded by consumers and government regulatory agencies. Accordingly, automotive manufacturers and suppliers expend great effort and capital in researching and developing technology to improve the operation of the internal combustion engine. Turbochargers are one area of engine development that is of particular interest.

A turbocharger uses exhaust gas energy, which would normally be wasted, to drive a turbine. The turbine is mounted to a shaft that in turn drives a compressor. The turbine converts the heat and kinetic energy of the exhaust into rotational power that drives the compressor. The objective of a turbocharger is to improve the engine's volumetric efficiency by increasing the density of the air entering the engine. The compressor draws in ambient air and compresses it into the intake manifold and ultimately the cylinders. Thus, a greater mass of air enters the cylinders on each intake stroke.

The more efficiently the turbine can convert the exhaust heat energy into rotational power and the more efficiently the compressor can push air into the engine, the more efficient the overall performance of the engine. Accordingly, it is desirable to design the turbine and compressor wheels to be as efficient as possible. However, various losses are inherent in traditional turbine and compressor designs due to turbulence and leakage.

While traditional turbocharger compressor and turbine designs have been developed with the goal of maximizing efficiency, there is still a need for further advances in compressor and turbine efficiency.

SUMMARY

Provided herein is a turbocharger compressor cover including an inner shroud contour configured to receive a compressor wheel having a plurality of blades. Each blade includes a leading edge, a contour edge, and a trailing edge. An inlet passage leads to the inner shroud contour and a circumferential groove is formed around the inlet passage. The groove includes a trailing edge that is aligned with the outboard end of the leading edge of the blades.

In certain aspects of the technology described herein, the compressor cover includes an edge relief formed along the groove trailing edge, such as a 45 degree chamfer. The circumferential groove has a width and a depth, wherein the width and depth are approximately equal. In an embodiment, a chamfer intersects the groove approximately half the depth from the bottom of the groove. The chamfer may intersect the groove 43% of the depth from the base of the groove. In an embodiment, the width and depth of the groove is 3 mm and the chamfer intersects the groove 1.3 mm from the bottom of the groove.

Also disclosed herein is a turbocharger including a compressor wheel having a plurality of blades, each blade includes a leading edge, a contour edge, and a trailing edge. The turbocharger includes a compressor cover that includes an inner shroud contour configured to receive the compressor wheel and an inlet passage leading to the inner shroud contour. A circumferential groove is formed around the inlet passage and includes a groove trailing edge that is aligned with the outboard end of the leading edge of the blades.

These and other aspects of the disclosed technology will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

DRAWINGS

Non-limiting and non-exhaustive embodiments of the compressor cover with circumferential groove, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
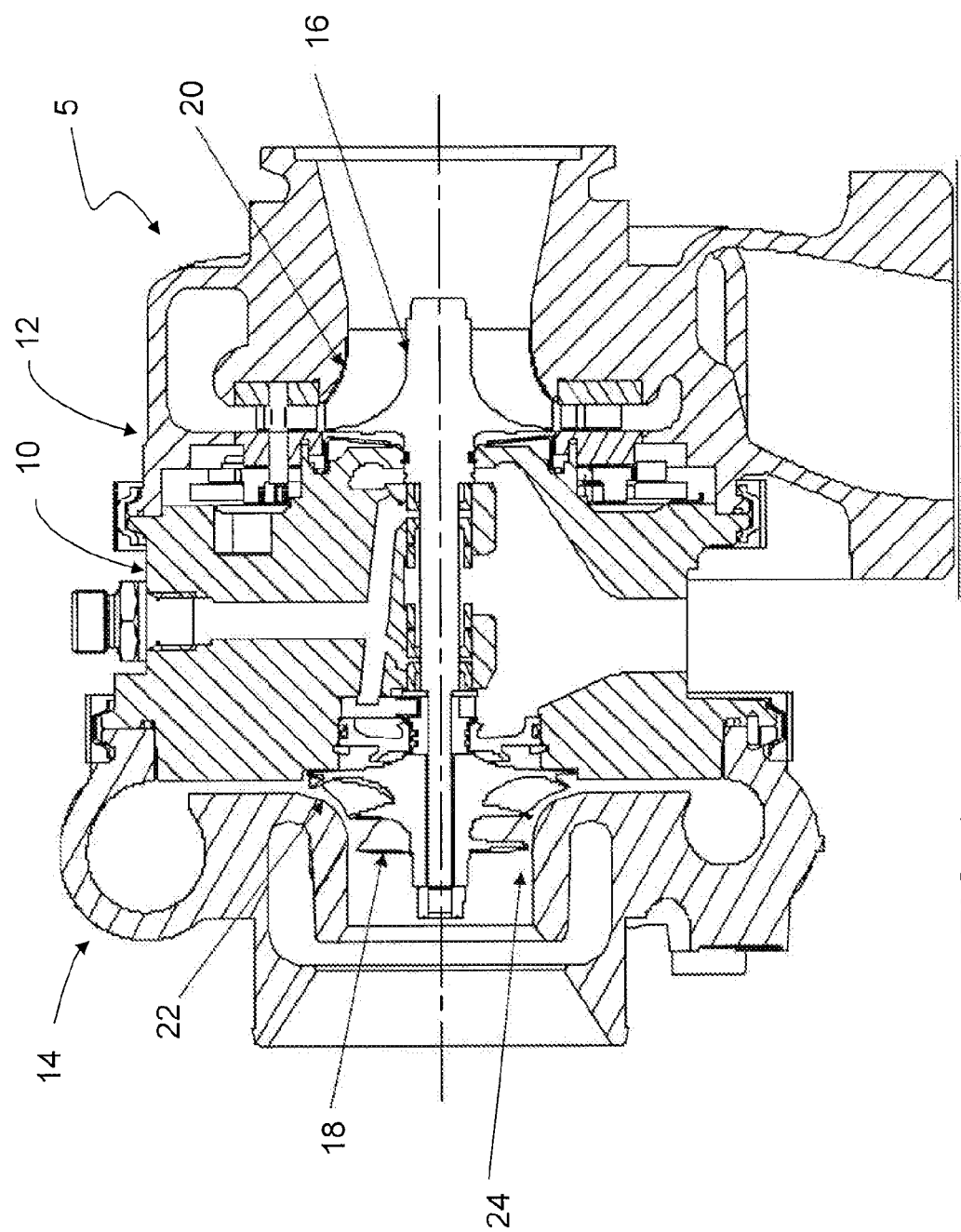
FIG. 1 is a side view in cross-section of a turbocharger.

As shown in FIG. 1, turbocharger 5 includes a bearing housing 10 with a turbine shroud 12 and a compressor shroud 14 attached thereto. Turbine wheel 16 rotates within the turbine shroud 12 in close proximity to the turbine shroud inner surface 20. Similarly, the compressor wheel 18 rotates within the compressor shroud 14 in close proximity to the compressor inner shroud contour 22. The compressor cover 14 includes an inlet passage 24 that leads to the inner shroud contour 22. The construction of turbocharger 5 is that of a typical turbocharger as is well known in the art.

Figure 2:
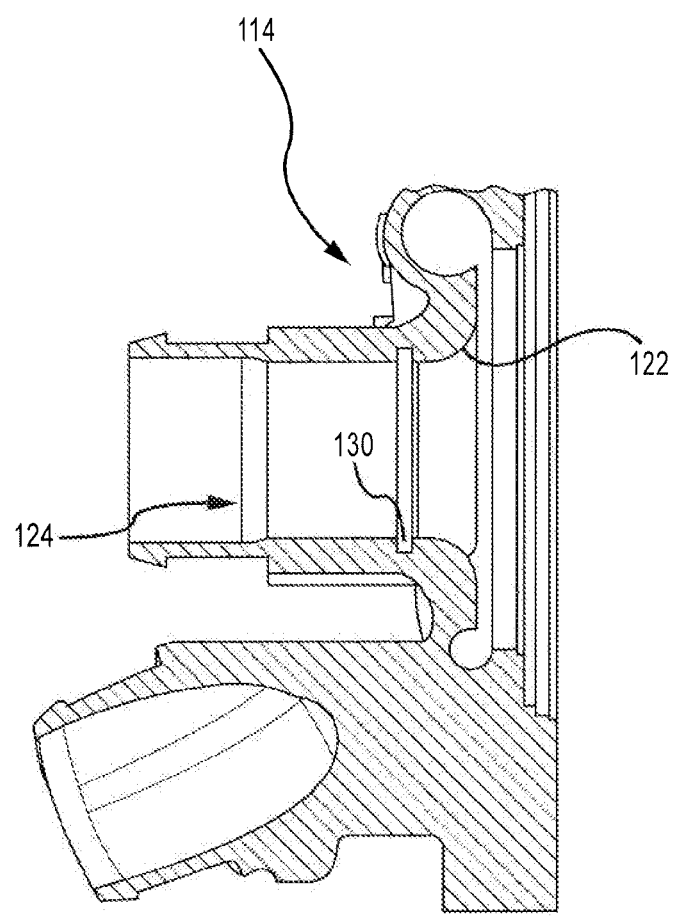
FIG. 2 is a side view in cross-section illustrating a turbocharger compressor cover according to an exemplary embodiment that includes a circumferential groove.

FIG. 2 illustrates an improved turbocharger compressor cover 114 according to an exemplary embodiment. The compressor cover 114 includes an inlet passage 124 that leads to an inner shroud contour 122. A circumferential groove 130 is formed around the inlet passage 124. The inner shroud contour 122 is configured to receive a compressor wheel 118 having a plurality of blades 140.

Figure 3:
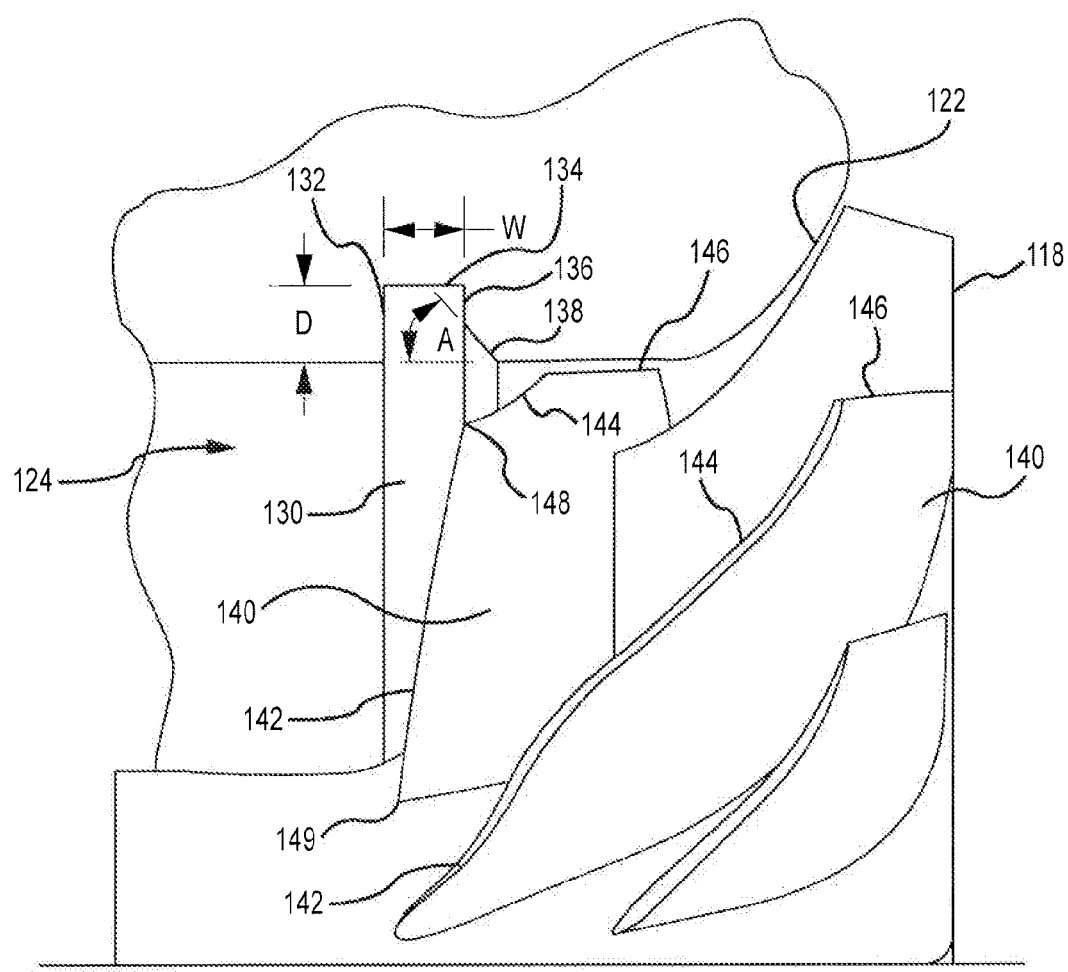
FIG. 3 is an enlarged partial cross-section of the groove shown in FIG. 2.

With further reference to FIG. 3, compressor wheel 118 includes a plurality of blades 140, each of which includes a leading edge 142, a contour edge 144, and a trailing edge 146. As can be appreciated in the figure, the leading edge 142 extends from an inboard end 149 to an outboard end 148. Circumferential groove 130 includes a leading edge 132 and a trailing edge 136. The groove trailing edge 136 is aligned with the outboard end 148 of the leading edge 142. In an embodiment, the groove trailing edge 136 is aligned with the transition (at 148) between the leading edge 142 and the contour edge 144.

The bottom 134 of the groove 130 extends between the leading and trailing edges 132, 136. Groove 130 also includes an edge relief 138 formed along the groove trailing edge. In this case, the edge relief 138 is in the form of a chamfer. In this case, the chamfer has an angle A which is 45 degrees; however, other angles may be used.

Circumferential groove 130 has a width W and a depth D and in this embodiment the width and depth are approximately equal. In one exemplary embodiment, the width and depth of the groove are both 3 mm and the chamfer 138 intersects the groove 1.3 mm from the bottom 134 of the groove 130. The chamfer may intersect the groove approximately half the depth D from the bottom of the groove. While edge relief 138 is shown as a chamfer, edge relief 138 may be in the form of a radius, a step, or other suitable geometric configuration.

The circumferential groove 130 trailing edge chamfer 138, which is upstream of the leading edge of the compressor main blades, improves the pressure ratio characteristics, and reduces high pressure ratio soft surge noise, and broadband noise across the entire compressor map. The annular groove influences the angle of incidence of the incoming air to reduce leading edge flow separation, vortex shedding, and reduced stationary stall related broadband radiated noise levels at higher PR (>2PRT-T). The chamfer disrupts flow reversals in the groove pocket from developing into a soft surge noise that resonates at surge or Helmholtz frequencies. One beneficial side effect of the disclosed groove geometry is that a larger part of the blade works on incoming flow thereby increasing the pressure ratio of the stage.

Accordingly, the compressor cover with circumferential groove has been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

What is claimed is:

1. A turbocharger compressor cover (114), comprising:
an inner shroud contour (122) configured to receive a compressor wheel (118) having a plurality of blades (140), each blade (140) including a leading edge (142), a contour edge (144), and a trailing edge (146);
an inlet passage (124) leading to the inner shroud contour (122);
a circumferential groove (130) formed around the inlet passage (124) and including a groove trailing edge (136) aligned with an outboard end (148) of the leading edge (142) of the plurality of blades (140); and including an edge relief (138) formed along the groove trailing edge, wherein the edge relief (138) is a chamfer.

2. The turbocharger compressor cover (114) according to claim 1, wherein the chamfer is a 45 degree chamfer.

3. The turbocharger compressor cover (114) according to claim 1, wherein the circumferential groove (130) has a width and a depth, wherein the width and depth are approximately equal.

4. The turbocharger compressor cover (114) according to claim 3, wherein the chamfer intersects the groove (130) approximately half the depth from a bottom (134) of the groove (130).

5. The turbocharger compressor cover (114) according to claim 3, wherein the chamfer intersects the groove 43% of the depth from the bottom (134) of the groove (130).

6. The turbocharger compressor cover (114) according to claim 4, wherein the width and depth of the groove (130) is 3 mm and the chamfer intersects the groove 1.3 mm from a bottom (134) of the groove (130).

7. A turbocharger compressor cover (114), comprising:
an inner shroud contour (122) configured to receive a compressor wheel (118) having a plurality of blades (140), each blade (140) including a leading edge (142), a contour edge (144), and a trailing edge (146);
a cylindrical inlet passage (124) leading to the inner shroud contour (122); and
a circumferential groove (130) formed around the inlet passage (124) and including:
a groove trailing edge (136) aligned with an outboard end (148) of the leading edge (142) of the plurality of blades (140);
an edge relief (138) formed along the groove trailing edge (136); and
wherein the circumferential groove (130) has a width and a depth, and the edge relief (138) intersects the groove (130) approximately half the depth from a bottom (134) of the groove (130).

8. The turbocharger compressor cover (114) according to claim 7, wherein the width and depth are approximately equal.

9. The turbocharger compressor cover (114) according to claim 7, wherein the edge relief (138) is a chamfer.

10. A turbocharger, comprising:
a compressor wheel (118) having a plurality of blades (140), each blade (140) including a leading edge (142), a contour edge (144), and a trailing edge (146);
a compressor cover (114), including:
an inner shroud contour (122) configured to receive the compressor wheel (118);
an inlet passage (124) leading to the inner shroud contour (122);
a circumferential groove (130) formed around the inlet passage (124) and including a groove trailing edge (136) aligned with an end (148) of the leading edge (142) of the plurality of blades (140); and including an edge relief (138) formed along the groove trailing edge, wherein the edge relief (138) is a chamfer.

11. The turbocharger according to claim 10, wherein the chamfer intersects the groove (130) approximately half the depth from a bottom (134) of the groove (130).

* * * * *